United States Patent [19]

McNulty et al.

[11] Patent Number: 5,596,199

[45] Date of Patent: Jan. 21, 1997

[54] PASSIVE SOLID STATE MICRODOSIMETER WITH ELECTRONIC READOUT

[75] Inventors: Peter J. McNulty, Sseneca; W. Joseph Beauvais, Central; David R. Roth, Pendleton, all of S.C.; Wanda K. Moran, Phoenix, Ariz.; Robert A. Reed, Clemson, S.C.

[73] Assignee: Clemson University, Clemson, S.C.

[21] Appl. No.: 383,959

[22] Filed: Feb. 6, 1995

[51] Int. Cl.⁶ .............................. G01T 1/24; G01T 1/02
[52] U.S. Cl. ............................. 250/370.07; 250/370.06
[58] Field of Search ......................... 250/370.06, 370.07

[56] References Cited

U.S. PATENT DOCUMENTS

| | | | |
|---|---|---|---|
| 4,485,442 | 11/1984 | Snaper et al. | 250/336.1 |
| 4,517,464 | 5/1985 | Heath et al. | 250/578 |
| 4,591,984 | 5/1986 | Mori | 250/363 S |
| 4,608,655 | 8/1986 | Wolf et al. | 250/370.07 |
| 4,672,544 | 6/1987 | Chizallet et al. | 250/374 |
| 4,757,202 | 7/1988 | East | 250/370.07 |
| 4,859,853 | 8/1989 | Kronenberg | 250/370.07 |
| 5,091,653 | 2/1992 | Creager et al. | 250/484.5 |
| 5,256,879 | 10/1993 | McNulty et al. | 250/370.06 |

OTHER PUBLICATIONS

1990 Recommendations of the International Commission on Radiological Projection pp. 79–89, Nov. 1990, New York, New York.

D. R. Roth et al., Solid State Microdosimeter for Spacecraft Applications, 1993 Clemson, South Carolina.

P. J. McNulty, Radiation Exposure, Dosimetry and Risks, pp. 514–519, Department of Physics and Astronomy, Clemson, South Carolina.

Inside AMD's CMOS EPROM Technology, pp. 2–3 through 2–16, Jul. 1993.

C. A. Sondhaus et al., Cell–Oriented Alternatives to Dose, Quality Factor, and Dose Equivalent for Low–Level Radiation, pp. 35–48, Heath Physics, Jul., 1990.

M. N. Varma et al., Empirical Evaluation of Cell Critical Volume Dose vs. Cell Response Function for Pink Mutations in Tradescantia, pp. 440–450, Upton, NY.

P. J. McNulty et al, Uncertainties in Radiation Effect Predictions for the Natural Radiation Environments of Space, Dept. of Physics and Astronomy, Clemson, South Carolina, USA and NASA, Greenbelt, MD USA, 1994.

V. P. Bond et al., A Stochastic, Weighted Hit Size Theory of Cellular Radiobiological Action, pp. 424–437, Published by the Commission of the European Committee, Proceedings of 8th Symposium, Sep. 27–Oct. 1, 1982, Report Eur 8395 EN.

N. G. Blamires et al., pMOS Dosimeters: Long–Term Annealing and Neutron Response, pp. 1310–1315, IEEE Transactions on Nuclear Science, vol. NS–33, No. 6, Dec. 1986.

(List continued on next page.)

Primary Examiner—Carolyn E. Fields
Attorney, Agent, or Firm—Dority & Manning, P.A.

[57] ABSTRACT

Apparatus and method for qualitatively and quantitatively analyzing a complex radiation field are provided. A passive microdosimetry detector device records the energy deposition of incident radiation using an array of microstructure non-volatile memory devices. Each microstructure non-volatile memory device is capable of storing a predetermined initial charge without requiring a power source. A radiation particle incident to a microstructure non-volatile memory device is termed an "event". Each such event may generate a charge within a sensitive volume defined by the microstructure non-volatile memory device. The charge generated within the sensitive volume alters the stored initial charge by an amount falling within a range corresponding to the energy deposited by certain particle types. Data corresponding to such charge alterations for a plurality of microstructure non-volatile memory devices within an array of such devices are presented to a qualitative analyzing device. The qualitative analyzing device converts the data to a spectral analysis of the incident radiation field by applying ICRP-recommended weighting factors to individual events or approximations thereof.

66 Claims, 6 Drawing Sheets

OTHER PUBLICATIONS

P. J. McNulty et al., Comparison of the Charge Collecting Properties of Junctions and the SEU Response of Microelectronic Circuits, pp. 1–9, Clemson, South Carolina, Sep. 6, 1990.

P. J. McNulty et al., Characterizing Complex Radiation Environments Using More (Monitor of Radiation Effects), Oct. 15–18, 1990.

P. J. McNulty, Predicting Single Event Phenomena in Natural Space Environments, pp. 3-1 through 3-83, Clemson University, Clemson, SC, July 16, 1990.

R. G. Benson, Small is Beautiful: SAIC's New Dosimeter, Nuclear Engineering International, p. 18, May 1991.

R. Fletcher, Electronic Personal Dosimeter Heralds Revolution in Legal Dosimetry, pp. 19–22, Nuclear Engineering International, May 1991.

Siemans Advertisement for Electronic Personal Dosimeter, p. 7, Nuclear Engineering International, May 1991.

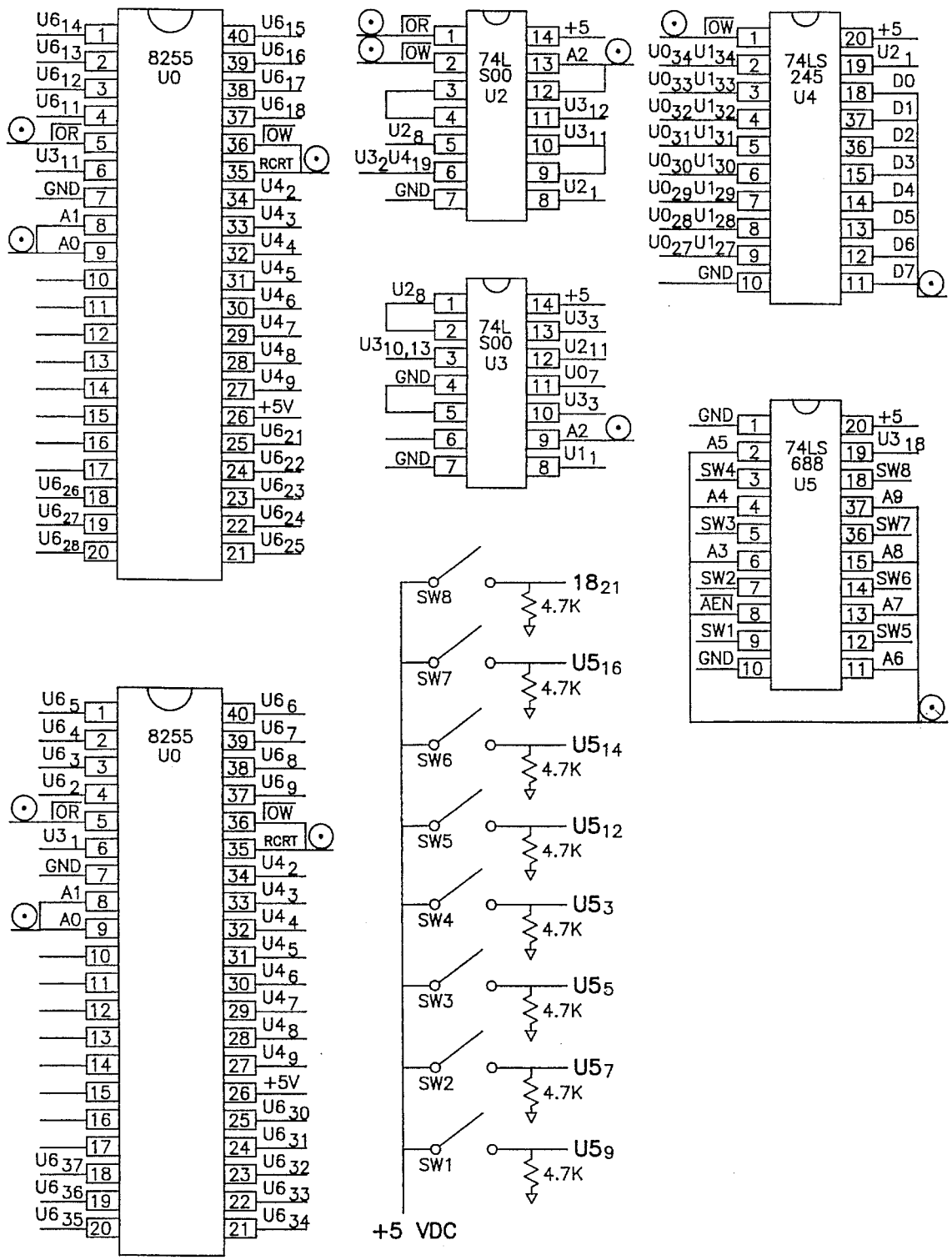

PASSIVE SOLID STATE MICRODOSIMETER WITH ELECTRONIC READOUT

BACKGROUND OF THE INVENTION

The present invention relates to solid state microdosimetry and more particularly to devices and methodology concerning a passive array of microstructure radiation sensitive volumes which enable the recording of radiation exposures occurring on a microscopic level.

The probability that a given exposure to low-level ionizing radiation will result in significant damage to an organism depends on the number of ionizations generated within the regions of biological cells containing DNA, principally the cell nucleus. As a result, the National Council on Radiation Protection and Measurement defines, for example, dose equivalent (DE) limits for work exposure to a specific type of radiation in terms of the product of the dose, a measure of the number of ionizations per unit volume expressed in terms of energy deposition per unit mass, and a quality factor (QF) which depends on the density of ionizations along the particle's trajectory. See ICRP "Recommendations of the International Commission on Radiological Protection," ICRP Publication 60, Annals of the ICRP, 21 No. 1–3, Pergamon Press, Oxford, 1991. That is:

$$DE(rem) = QF \times Dose(rads) \qquad \text{(Equation 1)}$$

Dose equivalent is not, however, the only measurement of the propensity of radiation to damage a given type of irradiated area or volume. Other measurements have been employed in performing such a spectral analysis of incident radiation. In particular, as detailed in the above-referenced ICRP Publication, the ICRP has defined dose equivalent related concepts of equivalent dose and effective dose. For ease of explanation, however, dose equivalent will be hereafter given as the primary example.

Ionization density is normally expressed in terms of the charged particle's linear energy transfer (LET). Particles with higher LET values deposit relatively more energy and generate more ionizations within the biological cell nuclei they traverse. The probability of a somatic mutation or other biological effect increases with the LET of the incident radiation until some optimum value and then falls off at higher LET values. The relationship among dose, dose equivalent, and cell response is described in more detail in the scholarly articles by C.A. Sondhaus, V. P. Bond, and L. E. Feinendegen, "Cell Oriented Alternatives to Dose, Quality Factor, and Dose Equivalent for Low-Level Radiation," Health Physics 59, 35–48 (1990); V. P. Bond and M. N. Varma, "Low-Level Radiation Response Explained in Terms of Fluence and Cell Critical Volume Dose" and "Empirical Evaluation of Cell Critical Volume Dose vs. Cell Response Function for Pink Mutations in Tradescantia," in *Eight Symposium on Microdosimetry*, (Julich, Germany, Commission of the European Communities, 1983) 423–450.

An instrument capable of measuring the energy deposition in small microvolumes and assigning quality factors to each event separately is disclosed in commonly assigned U.S. Pat. No. 5,256,879. The disclosure of such '879 patent is hereby fully incorporated herein by reference. The invention disclosed in the '879 patent is an active microdosimetry device, i.e., one requiring associated electronics and a constant power source. More particularly, it records transient events and requires its associated electronics to store a permanent record of radiation exposure.

While the disclosure of the '879 patent is appropriate and fully satisfactory in many instances, many other applications for a microdosimeter, however, favor a totally passive device (i.e., one requiring no power during exposure). Such is particularly true, for example, with respect to personnel radiation detection devices and space applications. Personnel detectors preferably should be small and light enough to be comfortable and to allow freedom of movement. The absence of a power source and measurement electronics as associated with active microdosimeters therefore makes passive devices relatively more attractive in such situations. Similarly, the size, weight, and power consumption constraints involved in any application for use in space make a passive microdosimeter approach more attractive than an active microdosimeter arrangement.

As a result, a choice between an active microdosimeter and prior passive dosimeter arrangements requires a choice between accepting the above-described constraints involved with an active microdosimeter and the inability of typical previous passive dosimeters to distinguish among radiation that is likely to cause damage in biological cells or microelectronic devices.

Therefore, to avoid the necessity of choosing between only such two devices, it is desirable to have a passive microdosimetry device, that is, a device capable of calculating dose-equivalent or similar measure of the propensity of radiation to damage an irradiated area of interest and having an array large enough to measure exposure levels as low as a few millirem, yet which requires no individual detector-associated power source and measurement circuitry. Such a device would be able, for example, to detect and distinguish between events generated by neutrons and/or alpha particles. It would also be beneficial if the device were inexpensive and have simple on-board instrumentation. Current state of the art arrangements are generally described below.

There are generally two types of radiation detection instruments: dosimeters and microdosimeters. Dosimeters measure exposure in terms of dose. Microdosimeters characterize exposure in terms of dose equivalent or similar measurement capable of describing the propensity of incident radiation to damage an irradiated volume. Both types of instrumentation can be further characterized according to whether they are active or passive, i.e., according to whether they require power while recording exposure. A device is active if power is so required; it is passive if not.

Dosimeters generally characterize radiation exposure in terms of rads (ergs/gram), which is the dose, or the energy deposited per unit mass. Dose, in turn, is proportional to the number of ionizations per unit volume within a given material. As is explained more fully in U.S. Pat. No. 5,256,879 referenced above, dosimeters generally do not distinguish events according to the type of radiation and are limited to measuring exposure in terms of the amount of energy deposited per unit volume (dose) and the rate at which that energy is deposited (dose rate).

Dosimeters can be, furthermore, divided into active and passive devices. The passive devices cumulatively record some effect of the exposure which when the device is "read" can be translated into dose. That is, passive devices do not require power to record events during exposure to the incident radiation field. The radiation events leave a lasting effect upon the non-powered devices which a measurement device can later read or which causes some visible or audible effect upon the device. Passive devices may include various items such as film badges and thermo-luminescent dosimeter (TLD) devices.

In contrast, active devices require some type of external power to detect a radiation event. They may, for example, be used as integrating devices, such as a pocket dosimeter using an ionization chamber or a p-n diode, to measure total dose. They may also be continuously monitored to determine the dose rate as well as the total integrated dose. In particular, the latter configuration may be connected to a circuit which provides an audible and/or visible warning of dangerous levels of dose rate.

One type of active dosimeter employs a RadFET. The RadFET device is described in some detail in A. G. Holmes-Siedle, L. Adams, N. G. Blamires, and D. H. J. Totterdel, "PMOS Dosimeters: Long Term Annealing and Neutron Response", IEEE Transactions on Nuclear Science NS-33, 1310 (1986). A RadFET dosimeter incorporates a single transistor which is relatively large in size. As is generally true of all dosimeters, therefore, the RadFET device exhibits a large sensitive volume. For a metal oxide semiconductor, the sensitive volume may be generally defined as that volume about the junction within which charges (electron/hole pairs) generated by traversing radiation particles are efficiently collected at the junction.

As is discussed in more detail in the Detailed Description below, the likelihood that incident radiation will damage, for example, a cell nucleus or a DNA genome depends upon the size of the cell or genome. Thus, to qualitatively analyze an incident radiation field as to its propensity to cause such damage, the sensitive volume of the radiation detector should approximate the size of the physical volume of interest. As a result of its relatively large sensitive volume, therefore, the RadFet device is incapable of providing a radiation analysis compatible with ICRP weighting factors.

Although the circuitry used to read the RadFET dosimeter may vary, a basic method underlying the device is to measure the turn-on voltage of a PMOS transistor, that is, the voltage which must be applied between the source and drain of the PMOS transistor to turn it on. Exposure to radiation changes this turn-on voltage and, therefore, the RadFET may be used as a dosimeter by monitoring such change as caused by an incident field.

In particular, ionizing radiation causes a build-up of charge at the interface between the oxide and the substrate under the gate. The charge build-up is approximately proportional to the amount of energy deposited (number of electron-hole pairs generated) within the oxide under the gate. The gate is maintained at a constant voltage determined by the circuit and the methodology followed in reading the dosimeter. The charge deposited as a result of the radiation, therefore, moves the turn-on voltage either closer to, or farther away from, the charge held on the gate, depending on the device configuration. The energy deposition in the device may then be determined by measuring the difference between gate voltage and the post-irradiation turn-on voltage and comparing this measure to the pre-irradiation difference.

Dosimeters using such technology typically use a single transistor per sensor. Dosimeters based on such design, as is true of dosimeters generally, fail to distinguish among types of radiation. As a result, the RadFET technology as currently used is incapable of monitoring exposure in terms of dose equivalent or similar measurements.

As is described above, microdosimeters characterize exposure in terms of dose equivalent or similar measurement capable of describing the propensity of incident radiation to damage an irradiated volume. Such devices generally accomplish such a spectral analysis through the use of microstructure sensitive volumes that approximate the size of, for example, biological cell nuclei, DNA genomes, or micro-electronic junctions. One example of an active microdosimeter is the device disclosed in the above-referenced U.S. Pat. No. 5,256,879. Another example of an active device is the gas microdosimeter. Although such latter type of device employs a relatively large area within which radiation events are analyzed, microstructure areas are approximated by varying gas density within the device. Due to size and cost constraints, gas microdosimeters are not generally practical in, for example, personnel detection applications.

SUMMARY OF THE INVENTION

The present invention recognizes and addresses various of the foregoing problems, and others, concerning radiation detection. Thus, broadly speaking, one principal object of the present invention is to provide an improved microdosimetry device and corresponding method for qualitatively analyzing radiation occurring in a field of complex incident radiation.

A further object of the present invention is to provide a radiation monitoring device for qualitatively and quantitatively analyzing a complex radiation field to provide a dose equivalent estimate or similar measure of the propensity of incident radiation to damage an irradiated volume.

Yet another object of the present invention is to provide a passive radiation monitoring device capable of providing a quantitative and qualitative analysis of an incident radiation field.

It is a more particular present object to provide a radiation detector and methodology utilizing an array of microstructure non-volatile memory devices which define radiation sensitive volumes approximating the size of biological cell nuclei. Similarly, it is another object to utilize an array of microstructure non-volatile memory devices which define radiation sensitive volumes approximating the size of DNA genomes.

Yet another object of the present invention is to provide a microdosimetry device for spectrally measuring the effects of radiation upon biological cell nuclei or DNA genomes.

Still another object of the present invention is to provide a microdosimetry device which utilizes a detector array which may be partially read, thereby allowing a remaining area to continually record incident radiation.

A further object is to provide a personal sized microdosimetry device capable of measuring the dose equivalent, or related measurement, from an incident radiation field.

Similarly, it is a still further object to provide a personal sized microdosimetry device which does not require a continuous power source or associated measurement electronics.

The present invention is equally concerned with improved methodology corresponding with the above-referenced devices.

Additional objects and advantages of the invention will be set forth in part in the description which follows, and in part will be apparent to one of ordinary skill in the art from the description, or may be learned by practice of the invention. The objects and advantages of the invention may be realized and obtained by means of the instrumentalities and combinations particularly pointed out in the appended claims.

Also, it should be further appreciated that modifications and variations to the specifically illustrated and discussed features hereof may be practiced in various embodiments and uses of this invention without departing from the spirit and scope thereof, by virtue of present reference thereto. Such variations may include, but are not limited to, substitution of equivalent means and features, materials, or steps for those shown or discussed, and the functional or positional reversal of various parts, features, steps or the like.

Still further, it is to be understood that different embodiments, as well as different presently preferred embodiments, of this invention may include various combinations or configurations of presently disclosed features, steps, or elements, or their equivalents, including combinations or configurations thereof not expressly shown in the figures or stated in the detailed description.

The present invention utilizes a detector array of microstructure non-volatile memory devices wherein each microstructure non-volatile memory device acts as a separate detector. As with prior art microdosimeters generally, the sensitive volumes of the individual devices comprise microstructure sensitive volumes that permit spectral analysis of incident radiation fields utilizing the ICRP recommended weighting factors to arrive at various measurements of the likelihood that a given radiation field will cause damage to a particular sized volume.

Unlike prior art solid state microdosimeters, however, each sensitive volume of the present invention is generally one cubic micrometer or smaller, thereby approximating the size of a biological cell nucleus and approaching the size of a DNA genome. Although at present the exact dimensions of the respective sensitive volumes of the different devices which may be practiced with the present invention are not precisely known, they may be determined through direct experimentation as discussed generally below. The above approximation is, however, acceptable for analyzing radiation with regard to damaging events in the above-mentioned biological volumes.

Specifically, at such sensitive volume sizes, particles that deposit similar but distinct energies in larger volumes may deposit widely varying energies such that the ability and necessity to distinguish among such particles is eliminated. Consequently, it is generally only necessary to distinguish among particles making significantly different energy deposits, as is reflected by the assignment of weighting factors to ranges of energies by the ICRP as referenced above. Correspondingly, as is discussed below, the need to exactly determine the sensitive volume size at these levels is generally eliminated.

One presently preferred embodiment of the present invention, for example, is to be employed in personnel radiation measurement devices near nuclear facilities where the radiation fields of interest primarily require the distinction between neutrons and gamma rays, radiation types depositing significantly different energies within sensitive volumes of such size.

More particularly, the present invention provides an apparatus and method for passively recording a charge deposition corresponding to an energy deposition by incident radiation on the individual devices within the array of microstructure non-volatile memory devices. Further embodiments of the present invention provide apparatus and method for measuring such charge deposition, continuously or occasionally, so that a dose equivalent or similar estimate can be provided. The apparatus of the present invention overcomes the drawbacks associated with dosimeters generally discussed above and overcomes drawbacks associated with active microdosimeters, such as the need for a continuous power source and associated measurement electronics.

To achieve the objects and in accordance with the purposes of the invention, as embodied and broadly described herein, an exemplary apparatus of the present invention comprises an array of microstructure non-volatile memory devices, a plurality of such microstructure non-volatile memory devices each defining a corresponding microstructure sensitive volume within which charge is generated responsive to incident radiation and wherein at least one of the non-volatile memory devices is configured to store a predetermined initial charge such that the generated charge measurably alters such predetermined charge stored by the at least one microstructure non-volatile memory device.

In one preferred embodiment of the present invention, the array comprises a semiconductor device, and particularly an erasable programmable read only memory. In another preferred embodiment of the present invention, the detector array comprises a non-volatile random access memory.

In another preferred embodiment of the present invention, the semi-conductor device is configured so that each individual microstructure non-volatile memory device may be individually addressed and measured, thereby permitting the measurement of both the charge deposition in each device and the distribution of charges throughout the array.

The microstructure sensitive volumes of the microstructure non-volatile memory devices preferably each define a volume generally not more than one cubic micrometer. In still another preferred embodiment of the present invention, such sensitive volumes each define a volume of approximately 0.1 micrometer by 1.0 micrometer by 100 angstroms thick with respect to the incidence of the radiation field. It is generally preferred that each of such microstructure sensitive volumes define a volume approximately the size of a biological cell nucleus or a DNA genome.

The array of the present invention is configured to be measurably sensitive to an incident complex radiation field (i.e., a field subject to various radiation types, such as gamma, alpha, and/or neutron radiation). In one preferred embodiment of the present invention, a plurality of microstructure non-volatile memory devices comprise a measured area of the array, each holding a predetermined initial charge prior to exposure to the complex radiation field. In this embodiment, predetermined initial charge is stored on an electrically insulated gate embedded within each of microstructure non-volatile memory devices. Such charge is set relative to a known threshold charge such that traversal of the known threshold charge from the predetermined initial charge causes the microstructure non-volatile memory device to change state. In operation, incident radiation may cause a charge alteration within each irradiated device from the predetermined initial charge toward the threshold level.

To further achieve the objects and in accordance with the invention as embodied and broadly described herein, a passive microdosimetry system for quantitatively analyzing radiation incident thereon in a complex radiation field is provided. The system comprises at least one detector array of microstructure non-volatile memory devices, a plurality of such devices each defining a corresponding microstructure sensitive volume within which charge is generated responsive to incident radiation and wherein at lease one such microstructure non-volatile memory device is configured to store a predetermined initial charge such that the generated charge measurably alters the predetermined initial charge stored on the at least microstructure non-volatile memory device; a measurement device operatively associated with the detector array, comprising a communicating device for communicating with the at least one detector array, and a measuring mechanism for measuring the generated charge on such at least one microstructure non-volatile memory device; and a qualitative analyzing device operatively associated with the measurement device for converting the generated charge to a qualitative analysis of the complex radiation field.

Furthermore, the difference between the post irradiation charge and the predetermined initial charge corresponds to the charge deposited (i.e., the generated charge) during the array's exposure to the incident radiation. In particular, in this preferred embodiment, the measuring mechanism is configured to measure the charge alteration due to the incident radiation by changing the post-irradiation charge on the at least one microstructure non-volatile memory device at a known rate toward the threshold charge and determining the time required for each at least one microstructure non-volatile memory device to change state.

Furthermore, in this configuration, the qualitative analyzing device is configured to convert the charge deposition into an estimate of the number of events occurring within discrete energy bands within the measured area of array of microstructure non-volatile memory devices. The qualitative analyzing device is further configured in this embodiment to apply sensitive volume dependent weighting factors to the estimate according to the discrete energy bands, such weighting factors correlating to known energy ranges within which known ionizing particles, in sensitive volumes comparable to the sensitive volumes of the microstructure non-volatile memory devices, deposit energy so that a spectral analysis of the complex radiation field is generated.

In yet another preferred embodiment of this invention, the measuring mechanism furthermore measures the spatial distribution of charge depositions throughout the measured area. Similarly, the qualitative analyzing device is further configured in this embodiment to convert the charge deposition and charge distribution into an estimate of the number of events occurring within the measured area within discrete energy bands.

In yet another preferred embodiment of this invention, the measuring mechanism is configured to change the post-irradiation charge on the at least one microstructure non-volatile memory device by optical application of ultraviolet light to the at least one detector array. In still another preferred embodiment, the measuring mechanism is configured to change the post-irradiation charge on the at least one microstructure non-volatile memory device by the application of electrically generated tunneling current to the at least one microstructure non-volatile memory device. In a still further preferred embodiment, the measuring mechanism is configured to change the post-irradiation charge on the at least microstructure non-volatile memory device by the imposition of an electric field to the at least one microstructure non-volatile memory device in opposition to a stable state electric field maintained by the at least one microstructure non-volatile memory device.

In a preferred embodiment of the present invention, the passive microdosimetry system is configured as a personal sized radiation microdosimetry device. In another presently preferred embodiment, the passive microdosimetry system is configured as an area monitor, for example as an area monitor for a space platform.

There is furthermore provided a method for qualitatively analyzing a complex incident radiation field. The method comprises the steps of subjecting to the radiation field a detector array comprised of a plurality of microstructure non-volatile memory devices having a corresponding plurality of associated microstructure sensitive volumes; individually measuring the charge deposition on at least one of the microstructure non-volatile memory devices, the charge deposition being generated responsive to the incident radiation within the microstructure sensitive volumes; and providing the charge deposition to a means for converting the charge deposition to a qualitative analysis of the complex radiation field. Such presently preferred embodiment may further comprise the steps of converting the charge deposition into an estimate of the number of events within discrete energy bands occurring within the measured area of the array and translating the estimate into a spectral analysis of the complex radiation field.

In a preferred embodiment, the method further comprises the step of charging, prior to the subjecting step, the at least one microstructure non-volatile memory device of the array to a predetermined initial charge, such charge being altered during the subjecting step responsive to incident radiation. Furthermore, the predetermined initial charge is set relative to a known threshold charge such that traversal of the known threshold charge from the predetermined charge causes the at least one microstructure non-volatile device to change state. In this presently preferred embodiment, therefore, the measuring step further comprises the steps of changing the post-irradiation charge on the at least one microstructure non-volatile memory device at a known rate toward the threshold level and determining the time required for each microstructure non-volatile memory device to change state. In another presently preferred embodiment of this invention, the measuring step further comprises the step of detecting, prior to changing the post-irradiation charge, any at least one microstructure non-volatile memory device having changed state responsive to incident radiation.

In still another preferred embodiment of this invention, the translating step further comprises the step of applying sensitive volume dependent weighting factors to the estimate according to such discrete energy bands, such weighting factors correlating to known energy ranges within which ionizing particles, in sensitive volumes comparable to the sensitive volumes of the microstructure non-volatile memory devices, deposit energy so that a spectral analysis of the complex radiation field is generated.

The accompanying drawings, which are incorporated in and constitute a part of the specification, demonstrate embodiments of the invention and taken together with the description, serve to help explain the principles of the invention.

BRIEF DESCRIPTION OF THE DRAWINGS

A full and enabling disclosure of the present invention, including the best mode thereof, to one of ordinary skill in the art is set forth more particularly in the remainder of the specification, including reference to the accompanying figures, in which:

FIGS. 7a and 7b are schematic representations of an exemplary integrated circuit implementation of the exemplary circuitry as represented in FIG. 3.

DETAILED DESCRIPTION OF THE PREFERRED EMBODIMENTS

Reference will now be made in detail to the present preferred embodiments of the invention, examples of which are illustrated in the accompanying drawings. The following disclosure is for purposes of example only, and is not intended to limit broader aspects of the invention embodied thereby.

The apparatus and method of the present invention pertain generally to radiation monitoring systems, devices, and the like. Although the following description and appended figures generally refer to the invention in terms of a personal radiation microdosimetry device, such reference is not meant as a limitation upon the invention. For example, the method and apparatus of this invention are just as relevant to radiation monitoring systems and devices utilized as area monitors, such as area monitors in radiation work areas, residences, or automobiles. The present invention also pertains to monitors for space platforms (i.e., space vehicles supporting living beings and/or equipment). Furthermore, measuring and predicting the effects of low level radiation in any environment are within the spirit and scope of the present invention. It should be understood that the invention is generally referred to as a microdosimetry device for ease of illustration only and that such description is not a limitation upon the invention. The apparatus and method of this invention pertain to any use in which a qualitative analysis of a radiation field is desired.

Figure 1:
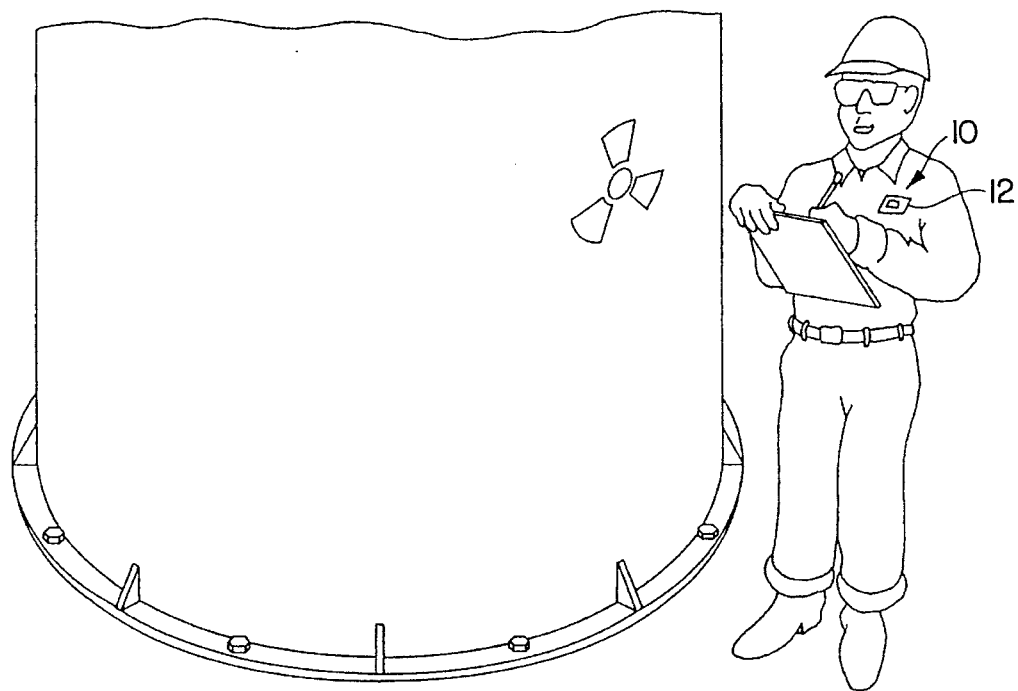
FIG. 1 illustrates a perspective view of an exemplary embodiment of the present invention used particularly as a personal radiation microdosimetry device.

A microdosimetry device for qualitatively analyzing radiation in a complex radiation field incident thereon is provided. As depicted in FIG. 1, microdosimetry device 10 of the present invention may comprise a personal microdosimetry device 12 compact and portable enough for an operator to wear, for instance attached to his or her person as a suitably packaged film badge.

Figure 2:
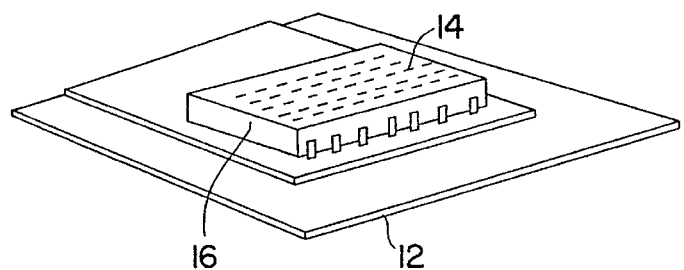
FIG. 2 is a perspective view of one preferred embodiment of the detector portion of the present invention.

Referring now to FIG. 2, microdosimetry device 12 comprises an array 14 of microstructure non-volatile memory devices. As embodied herein and shown for example in FIG. 2, detector array 14 is packaged in this embodiment as a semiconductor device 16. In the presently preferred embodiment, semiconductor device 16 comprises a commercially available erasable programmable read-only memory. It will be understood by those of ordinary skill in the art, however, that any equivalent package of microstructure non-volatile memory devices may be used without departing from the scope and spirit of the present invention. Thus, it is understood to be within the scope of the present invention to include any such packaging, such as, for example, a non-volatile random access memory device or an ultraviolet programmable read-only memory. For ease of explanation, the following discussion will refer to an erasable programmable read-only memory. However, this is not meant as a limitation upon the present invention.

Figure 3:
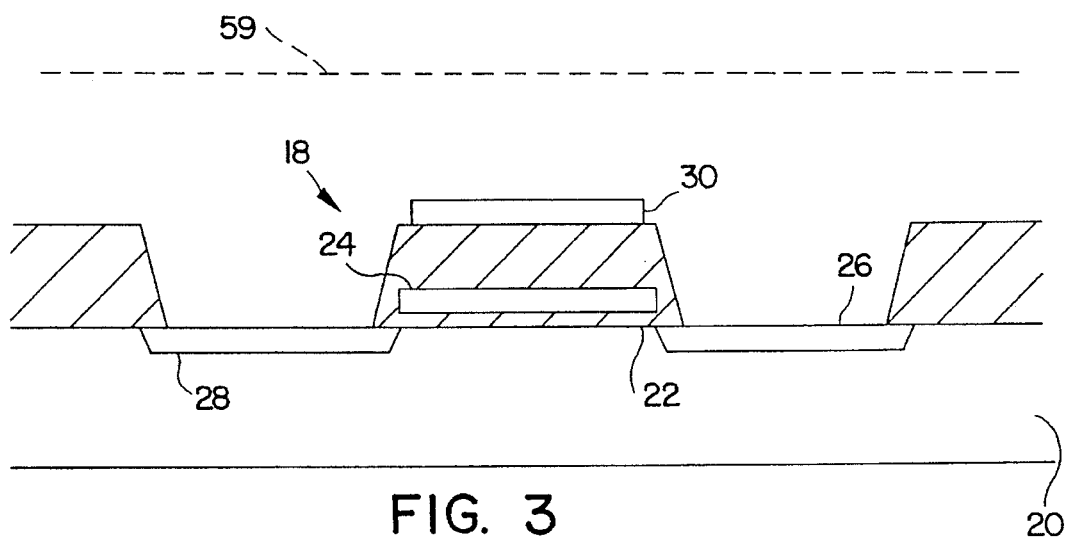
FIG. 3 is a cross-sectional view of an exemplary microstructure non-volatile memory device comprising one element in a detector array in accordance with the subject invention.

FIG. 3 is a cross sectional depiction of a floating-gate avalanche-injection metal-oxide semiconductor (FAMOS) transistor having a microstructure non-volatile device 18 established upon a substrate generally 20. Such a transistor may comprise, for example, one element within array 14 embodied within semiconductor device 16 as in FIG. 2. As will be understood by those of ordinary skill in the art, a FAMOS transistor is but one example of a microstructure non-volatile memory device. It will be understood to be within the scope and spirit of the present invention to utilize any equivalent microstructure non-volatile memory devices to comprise array 14.

Each microstructure non-volatile memory device 18 within array 14 as in FIG. 2 further defines an estimated sensitive volume shown as shaded area 22 in FIG. 3, within which charge is generated responsive to incident radiation as is explained in greater detail below. Although precise dimensions of sensitive volume 22 are at present unknown, FIG. 3 illustrates a current diagrammatic estimate.

It should be additionally understood that semiconductor 16 may be a multipurpose device. For example, a commercially available EPROM may contain an array 14 of microstructure non-volatile memory devices 18 which may be employed in any variety of data storage and retrieval functions. Because each element 18 of such an array 14 within such a device 16 is individually addressable, semiconductor device 16 may serve multiple functions. Thus, in another preferred embodiment of this invention, a plurality of microstructure non-volatile devices 18 may be utilized in analyzing an incident complex radiation field. The selected or determined area or portion of array 14 comprising this plurality of microstructure non-volatile memory devices 18 so employed, whether comprising the whole or part of array 14, will be hereafter referred to as the measured area.

Referring again to FIG. 3, each device 18 defines a corresponding sensitive volume 22. In this embodiment, sensitive volume 22 is believed to be located between floating-gate 24 and drain 26. However, those of ordinary skill in the art should understand that such is presently an estimate. Sensitive volume 22 may be larger and, for example, extend throughout the oxide between floating-gate 24 and substrate 20. The sensitive volume may, however, be generally defined as that region within the device within which charge generated by the traversing radiation particles is efficiently collected at floating-gate 24, thereby altering the charge thereon. Such charges are generated by the radiation particles as a result of collisions with atoms of the oxide crystalline structure within the sensitive volume 22. The number of charges generated is proportional to the energy of the traversing particles.

One measurement peculiar to individual particle types is the linear energy transfer (LET), which may generally be defined as the energy deposited per unit pathlength. Thus, regarding microstructure non-volatile memory device 18 as in FIG. 3, the charge collected at floating gate 24 is a function of the LET and sensitive volume size. Specifically, if the device is linear:

$$\text{energy deposited (McV)} = X * \text{LET} \ (MeV/mg/cm^2),$$

wherein $$X = 1/[\text{silicon density} \ (mg/cm^3) * \text{pathlength through sensitive volume}(cm)] \quad \text{(Equation 2)}$$

If information concerning the propensity of incident radiation to damage biological cells is desired, the total energy deposited, or dose, is an inadequate measurement. Specifically, the amount of damage depends upon the density of charge ionizations along a particle trajectory, since that effects the probability of damage to any given area. Dose equivalent is a unit of radiation that reflects the harmfulness of radiation. It is the dose multiplied by an International Commission on Radiological Protection (ICRP) recommended quality factor that depends on the density of ionizations along the particle trajectory. Because ionization densities differ among radiation types, quality factors differ among radiation types.

Therefore, such qualitative analysis of radiation fields may be achieved through a spectral analysis providing dose equivalent or some similar measurement as recommended by the ICRP. Because this requires association of various radiation types with corresponding quality factors, discrimination among radiation types is required.

Regarding a linear device, as indicated by Equation 2, the relationship between the energy deposited by a traversing particle and the particle's LET depends upon the size of the sensitive volume. If the energy deposited by a particle is known and the size of the sensitive volume is known, the value of the LET may be determined, thereby identifying the type of radiation. Note, however, that if the device is not linear, the dimensions of the sensitive volume depend upon the LET of the incident particle. That is, the sensitive volume will depend on the energy of the individual particle. This makes the computation more difficult, but not impossible.

Sensitive volume sizes of microstructure devices may be determined using this relationship. For example, a microstructure device may be bombarded with a radiation having a known LET. By measuring the collected charge, the sensitive volume size may be determined. Therefore, while at present the size of the sensitive volume defined by device 18 is unknown, it may be experimentally determined by such or a similar approach. However, as discussed below, it is practically unnecessary to further define the sensitive volume of device 18 because it is known to be within a range appropriate to adequately perform a spectral analysis of radiation incident to biological cell nuclei or DNA genomes. In this presently preferred embodiment, the respective sensitive volumes 22 of devices 18 (FIG. 3) are generally not more than one cubic micrometer each. The present best estimate is that such a sensitive volume 22 defines a volume of 0.1 micrometer by 1.0 micrometer long by 100 angstroms thick.

Figure 6A:
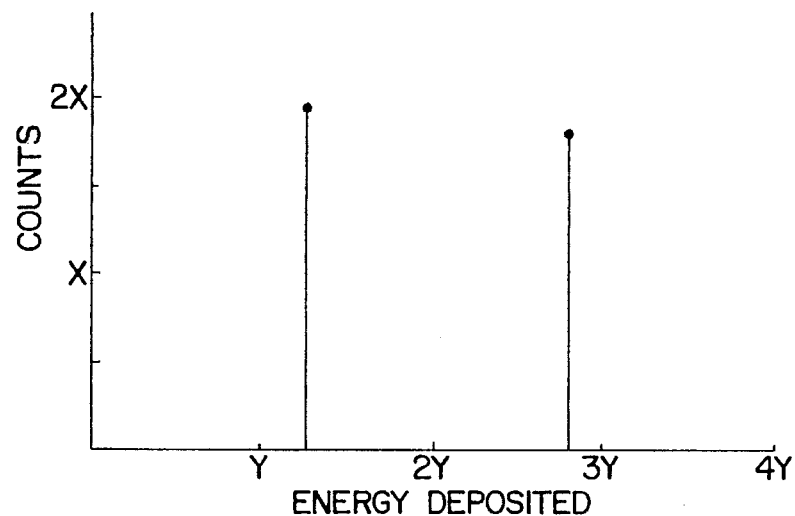
FIGS. 6a, 6b, and 6c are respective exemplary graphical depictions of the number of events at various energies occurring within arrays of exemplary sensitive volumes of respectively decreasing sizes.

To more generally illustrate the idea of a sensitive volume and its operation within the present invention, an ideal example is provided. Referring now to FIG. 6a, an ideal pulse height spectrum for a relatively large microstructure sensitive volume is provided. It should be noted, however, that the values and dimensions provided on the plot of FIG. 6a are by way of example only and do not purport to represent an actual expected ideal pulse height spectrum. In this ideal relatively large sensitive volume, all incident particles of a particular type deposit approximately the same amount of energy in the sensitive volume because each particle comes to rest within the sensitive volume, thereby depositing all of its energy.

Figure 6B:
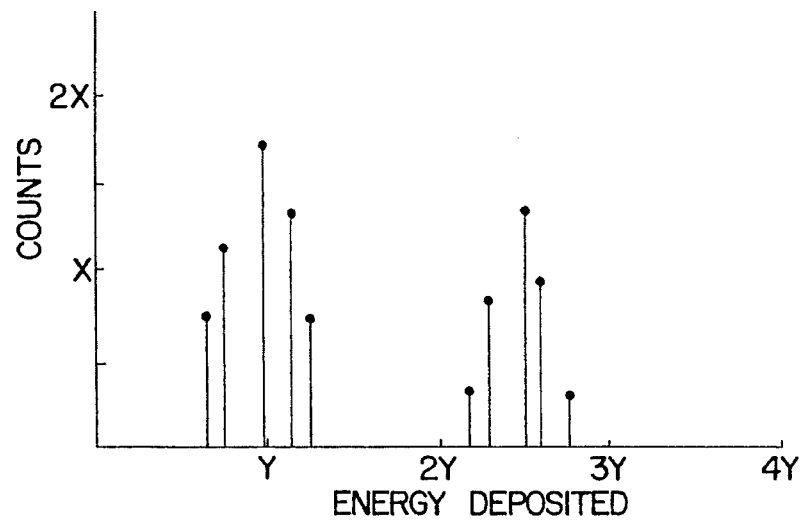

Referring now to FIG. 6b, a pulse height spectrum corresponding to a somewhat smaller microstructure sensitive volume is provided. As the sensitive volume becomes smaller, the incident particles will collide with fewer atoms in the crystalline structure, and consequently deposit less energy. In this case, fewer particles come to rest within the sensitive volume. Therefore, the majority of particles will pass through the sensitive volume, depositing less energy than the particles depicted in FIG. 6a. Consequently, the pulse height spectrum peaks shift to lower energies, and the spikes flatten out.

As, therefore, the sensitive volume becomes smaller, the average expected energy deposited becomes less than the expected energy derived from Equation 2. That is, the peaks begin to move to lower energies while the spikes spread into broader curves. This phenomenon is detailed in the Sondhaus and Bond article referenced above. This result is particularly acute when the sensitive volume becomes very thin with respect to the incident radiations angle of incidence.

As the sensitive volume size further decreases, the energy curves corresponding to particular radiation types spread into broader and broader curves, resulting in energy ranges within which particles of the various radiation types may be expected to deposit energy. Moreover, when particle types deposit similar energies, their respective energy ranges will overlap.

Figure 6C:
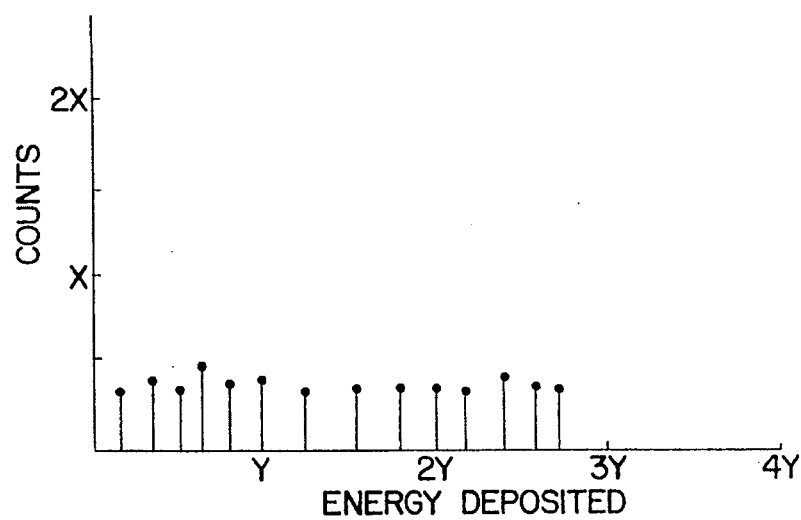

Referring to FIG. 6c, at sensitive volume sizes approaching the sizes of biological cell nuclei and DNA genomes, as explained by Sondhous and Bond, the curves have flattened out, resulting in a distribution of individual events representing the microdosimetry regime. Particular particle types still, however, deposit energy within corresponding energy ranges. Furthermore, the degree of overlap among energy ranges corresponding to particle types depositing similar energies increases so that the propensity of such particles to damage cells approximately equal in size to such sensitive volumes is approximately equal. At such microstructure sensitive volume dimensions, therefore, it becomes necessary only to distinguish among radiation types having significantly different energies. Consequently, the ICRP, as noted in the above-referenced ICRP recommendations and Tables 1 and 2, has recommended quality factors and, similarly, radiation weighting factors, corresponding to LET ranges and energy ranges for various radiation types.

| LET in Water (keV $\mu m^{-1}$) | QF(LET) |
|---|---|
| <10 | 1 |
| 10–100 | 0.32(LET) − 2.2 |
| >100 | $300/\sqrt{LET}$ |

TABLE 2

| Radiation Type | Energy Range | Radiation Weighting Factor |
|---|---|---|
| Photons | all energies | 1 |
| Electrons & muons* | all energies | 1 |
| Neutrons | <10 keV | 5 |
| | 10 keV–100 keV | 10 |
| | >100 keV–2 MeV | 20 |
| | >2 MeV–20 MeV | 10 |
| | >20 MeV | 5 |
| | >2MeV | 5 |
| Protons** | | 20 |
| Alpha particles, Fission fragmants, Heavy nuclei | | |

*excluding Auger electrons emitted from nuclei bound to DNA
**other than recoil protons Because, as discussed above, the LET is defined as the energy deposited by a particle per unit pathlength, the size of the sensitive volume should generally be known in order to determine the LET of unknown incident radiation. That is, if the size of the sensitive volume is known, a particle may be identified, through its LET, by dividing the energy deposited by that particle by the pathlength through the sensitive volume through which the particle traveled. However, as noted in appended Table 1, the ICRP recommended quality factors apply to ranges of LET. Correspondingly, only an approximate definition of the sensitive volume size is required. A similar analysis holds also for conversion by radiation weighting factors as described in appended Table 2.

Referring again to FIG. 2, a passive microdosimetry detector device 12 for recording the energy deposition of radiation incident thereto and enabling spectral analysis of a complex radiation field is depicted. The detector device 12 comprises an array 14 of microstructure non-volatile memory devices 18 (as in FIG. 3), each of a plurality of such microstructure non-volatile memory devices within array 14 defining a corresponding microstructure sensitive volume 22 (FIG. 3) within which charge is generated responsive to incident radiation. In a presently preferred embodiment of the invention, array 14 is packaged as a semiconductor device 16. Furthermore, semiconductor device 16 comprises an erasable programmable read-only memory (EPROM). Those of ordinary skill in the art will recognize that there are many commercially available EPROMS, for example, ultraviolet programmable read-only devices and electrically erasable programmable read-only memory devices. Additionally, semiconductor device 16 may comprise a non-volatile random access memory or equivalent device.

The choice of any particular device incorporating microstructure non-volatile memory devices may effect the choice of measurement methods and devices as described below. However, all such equivalent alternatives are understood to be within the scope of the present invention. Therefore, the utilization of an EPROM in this presently preferred embodiment does not serve as a limitation thereof.

In operation, EPROM 16 is configured, prior to exposure to a complex radiation field, such that the exposure will measurably alter the stored charge level of the microstructure non-volatile memory devices 18 (FIG. 3) of array 14. For example, referring now to FIG. 3, each device 18 has an inherent associated threshold voltage that must exist between the control gate and the drain before device 18 will be in an "on" state. When device 18 is on, conduction occurs between drain 26 and source 28. That is, above such threshold charge, for example, device 18 is on; below such threshold charge, for example, device 18 is off. Generally, therefore, each device 18 in array 14 may be initially charged to a predetermined level so that all devices 18 will be in one state. In this embodiment, this initial charge is stored on floating gate 24, an electrically isolated gate within device 18. As devices 18 are exposed to the complex radiation field, electron/hole pairs (or charges) are generated within sensitive volume 22, neutralizing some of the charge on floating gate 24, and bringing the charge on floating gate 24 closer to the threshold charge. Thus, the change from the predetermined initial charge to the post-irradiation charge corresponds to the number of charges generated, and, therefore, to the energy deposited within device 18 by incident radiation particles during exposure.

In this embodiment, the floating gates 24 of devices 18 are initially charged negatively, causing devices 18 to be initially in an "off" state. It is understood, however, that similar devices may be configured in such a way as to be initially on or to have positively charged floating gates. In such configurations, certain aspects of the following discussion would be altered accordingly as will be understood by those of ordinary skill in the art. Regarding this embodiment, then, the negative charge is set by applying a voltage between source 28 and drain 26 such that electrons from drain 26 are swept up to floating gate 24 by the more positively charged control gate 30, which is held at a constant voltage. Depending on the structure of device 18, the negative charge level that can be held on floating gate 24 is finite. That is, the charging process is self-limiting. By charging floating gate 24 to this self-limited charge level, all devices 18 within array 14 are easily brought to the same initial charge. It is understood, however, that such charge level choice is arbitrary.

Upon irradiation, electron/hole pairs are generated in sensitive volume 22. An electric field across the oxide comprising sensitive volume 22 sweeps the holes up to floating gate 24, where they neutralize the negative charges stored thereon. In this manner, the negative charge on device 18 is reduced towards the threshold voltage.

Figure 4:
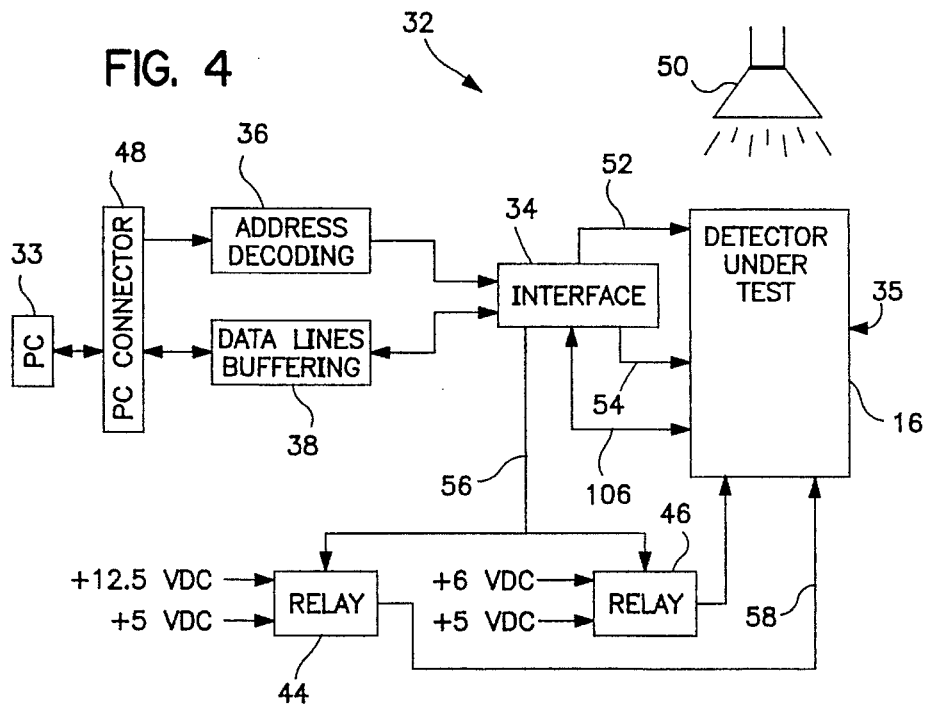
FIG. 4 is a schematic representation of circuitry comprising one exemplary embodiment of a measuring mechanism according to this invention.

In another embodiment of the invention, a measurement device 32 is operatively associated with detector array 16 as depicted in FIG. 4. Measurement device 32 comprises a communicating device for communicating with such at least one detector array 14, and a measurement mechanism for measuring the charge deposition on microstructure non-volatile device 18. A qualitative analyzing device, here embodied by personal computer 33, is operatively associated with such measurement device for converting the charge deposition to a spectral analysis of the complex radiation field.

Figure 7B:
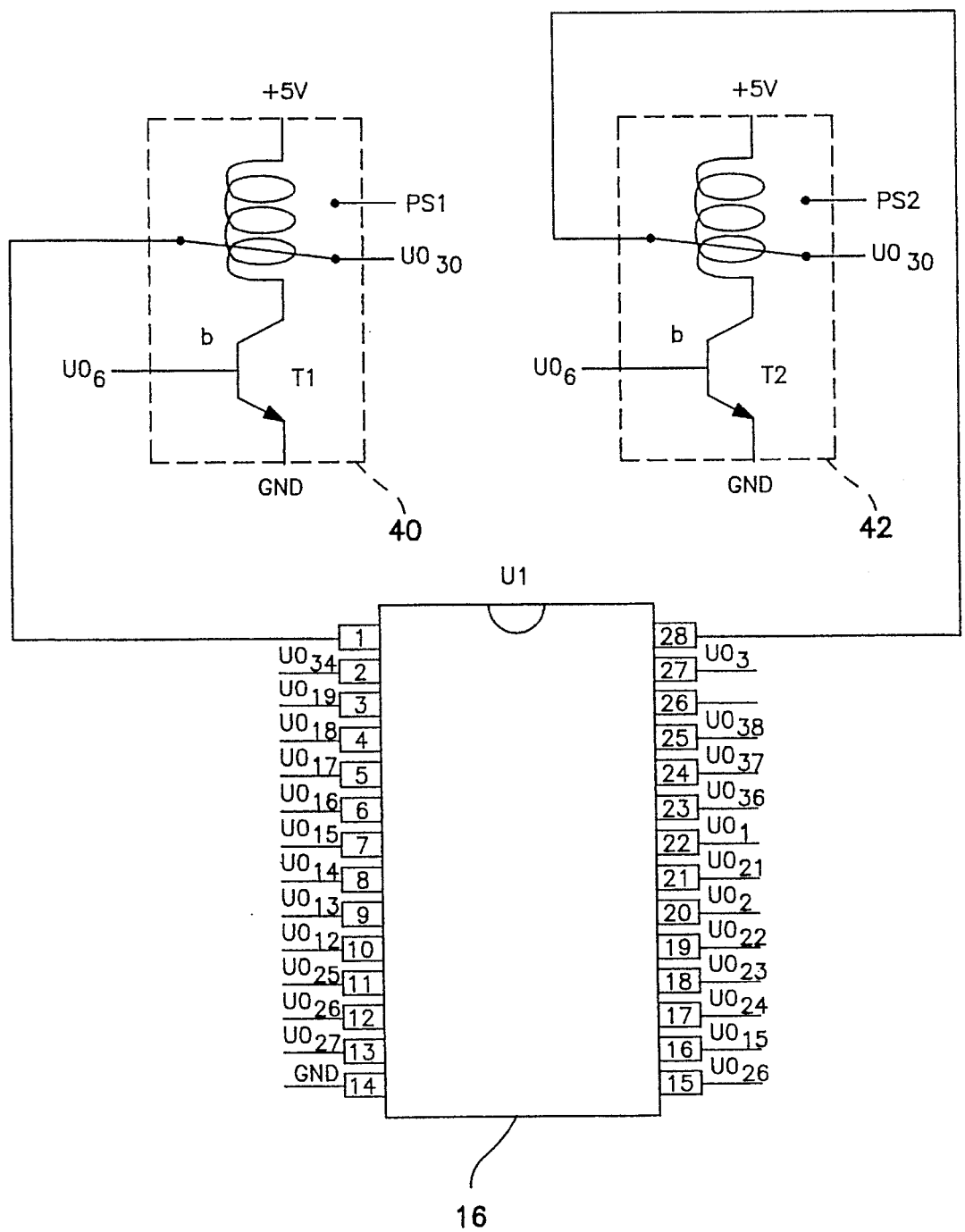

Referring again to FIG. 4, a schematic diagram of one exemplary embodiment of the above-mentioned measurement device 32 is provided. The diagram of FIG. 4 is a functional diagram corresponding to the schematics presented in FIGS. 7a and 7b. In particular, referring to FIG. 7a, chips U0 and U1 correspond to interface 34 of FIG. 4; chips U2, U3, and U5 correspond to address decoder 36; and chip U4 corresponds to buffer 38. Referring now to FIG. 7b, the transistor devices enclosed within the dashed lines at 40 and 42 comprise relays 44 and 46 of FIG. 4. U1 corresponds to the detector 16 being measured. In this presently preferred embodiment, detector 16 may be plugged into a communication device, shown generally under detector device 16 at 35, electrically connected to the circuitry of measurement device 32 as depicted in FIG. 4.

In this presently preferred embodiment, the qualitative analyzing device operably associated with measurement device 32 is comprised of a personal computer 33 in communication with measurement device 32 through PC connector 48.

In operation, measurement device 32 and detector device 16 are shown in a measurement configuration in that device 16 is exposed to ultraviolet light from ultraviolet lamp 50. More particularly, address decoder 36 receives instructions from the external PC 33 through PC connector 48, whereupon address decoder 36 translates such instructions into a form acceptable by and actable upon device 16 and/or relays 44 and 46. These instructions are then routed to detector 16 by control lines 52, address lines 54, and relay control lines 56, as will be understood by those of ordinary skill in the art. Data lines 58 are utilized to retrieve measurement information from device 16 through interface 34 to data buffer 38, from which the stored information will be read by the external PC 33 through PC connector 48 according to the PC's operating parameters.

It should be understood that the configuration of the circuitry of measurement device 32 as depicted in FIG. 4 is not a limitation upon the present invention. Such configuration may vary, for example, with the use of varying semiconductor detector devices 16 as described above. For example, those of ordinary skill in the art will recognize that control lines 52 may additionally comprise a program enable line if device 16 comprises an EPROM. Furthermore, the program voltage supplied through relay 44 over a program voltage line 58 may be required by device 16 to perform various functions as is understood in the art. Relays 44 and 46, consequently, provide possible voltage alternatives as necessary and are controlled by the external PC 33 through address decoder 36 and interface 34 over relay control lines 56.

Additionally, the circuit of measurement device 32 as in FIG. 4 serves as a charging means for charging the plurality of microstructure non-volatile memory devices 18 (FIG. 3) to a predetermined initial charge prior to exposure to a complex radiation field. Specifically, the charging process is directed from the external PC 33 by instructions directed through PC connector 48, address decoder 36, and interface 34 over control lines 52 and address lines 54 and utilizing the program voltage from program voltage line 58. It will be again understood, however, that there are various ways of setting such predetermined initial charge to the individual microstructure non-volatile memory devices 18 comprising array 14 within device 16, depending on the nature of device 16 and microstructure non-volatile memory devices 18.

As is apparent from the discussion above, therefore, the circuitry of measurement device 32 as in FIG. 4 may serve both as a charging means and as a measurement mechanism with respect to a detector 16 through the communication device 35 of measurement device 32.

It is also considered to be within the scope of the present invention that semiconductor device 16 or individuals of microstructure non-volatile memory devices 18 may be shielded with varying types and degrees of shielding material, such as tissue equivalent plastic, so that the charge collected within microstructure non-volatile memory devices 18 simulates that collected within specific biological tissue. Such shielding material may also be used to simulate the environment within which it is desired to qualitatively analyze a radiation field. One exemplary embodiment of shielding material surrounding a sensitive volume within a microdosimetry device is presented in FIG. 5 of the above-referenced U.S. Pat. No. 5,256,879. Similar shielding material, as indicated in phantom at 59 in FIG. 3, may be utilized to shield the array 14 or a portion thereof. Shielding 59 is represented diagrammatically and is not intended to represent particular shielding dimensions or materials.

The shielding material may also be utilized to customize array 14 to represent any number of operating environments or to simulate any type of biological tissue. For example, neutrons could cause significant damage if inhaled into the lung or swallowed into the stomach. Thus, to simulate an internal organ being subjected to an incident neutron, microstructure non-volatile memory device 18 would be heavily shielded with tissue equivalent shielding material. Likewise, to simulate a cornea of an eye being subjected to an incident neutron, microstructure non-volatile memory device 18 would be relatively unshielded.

In further accordance with the present invention, a method for qualitatively analyzing a complex incident radiation field is provided. The method comprises the first step of subjecting to the radiation field a detector array comprised of a plurality of microstructure non-volatile memory devices each having a corresponding plurality of associated microstructure sensitive volumes. Furthermore included is the step of measuring the charge deposition on at least one of the microstructure non-volatile memory devices, the charge deposition being generated responsive to the incident radiation within the microstructure sensitive volumes. The measuring step provides data corresponding to the charge deposition on each individual measured microstructure non-volatile memory device. Such data is then output for converting the charge deposition to a qualitative analysis of the complex radiation field.

In a preferred embodiment of the method of this invention, the method further comprises converting the charge deposition into an estimate of the number of events within discrete energy bands occurring within the measured area of the array of microstructure non-volatile memory devices and translating the estimate into a spectral analysis of the complex radiation field. An event is defined as the traversal by a radiation particle of a sensitive volume 22 as in FIG. 3. An energy band is an energy range within which particles of certain radiation types may be expected to deposit energies as they traverse sensitive volumes having dimensions within a certain range, as described above. The spectral analysis may be achieved by applying quality factors or similar measures of the propensity of incident radiation to cause damage to applicable volumes of a size similar to the sensitive volumes, to the associated energy bands, as described above.

The method additionally comprises the step of charging to a predetermined initial charge, prior to the subjecting step, the microstructure non-volatile memory devices whereby the predetermined charge is altered during the subjecting step responsive to incident radiation. The predetermined initial charge, as described above, is set beyond a known threshold charge. The threshold charge is a charge level inherent to the microstructure non-volatile memory device 18, the traversal of which causes device 18 to change state. Therefore, as described above, radiation incident to a microstructure non-volatile memory device 18 initially holding the predetermined initial charge causes such charge to be altered towards the threshold charge such that a correlation exists between the post-irradiation charge held by microstructure non-volatile memory device 18 and the energy deposited in such device by incident radiation.

Accordingly, the method of this presently preferred embodiment further comprises the steps of changing the post-irradiation charge on the at least one microstructure non-volatile memory device 18 at a known rate toward the threshold level and determining the time required for such device to change state. As described below, there are various methods for altering the post-irradiation charge, depending, for example, on the nature of device 16 (for example, FIG. 2) and microstructure non-volatile memory device 18 (for example, FIG. 3).

Figure 5A:
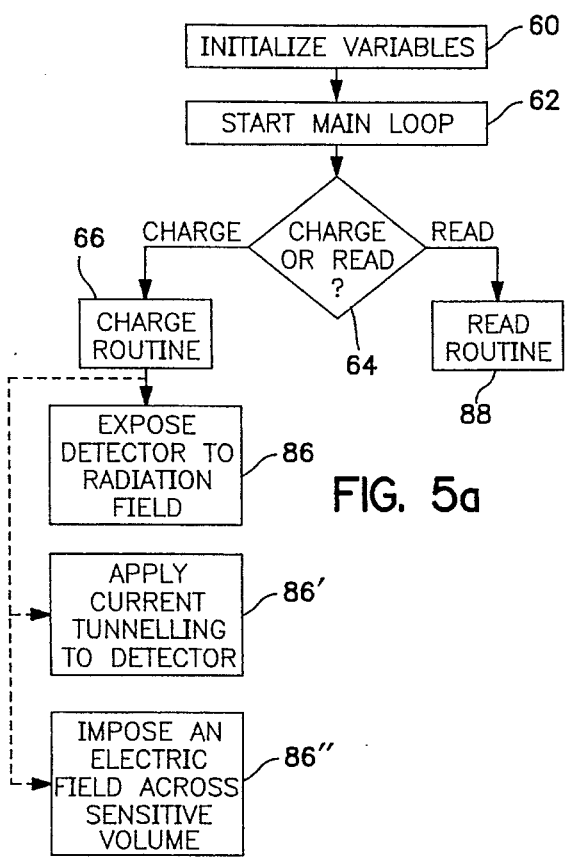
FIGS. 5a, 5b, and 5c are respective flow chart representations of the charging and measuring steps according to one exemplary embodiment of the method according to the present invention.
Figure 5B:
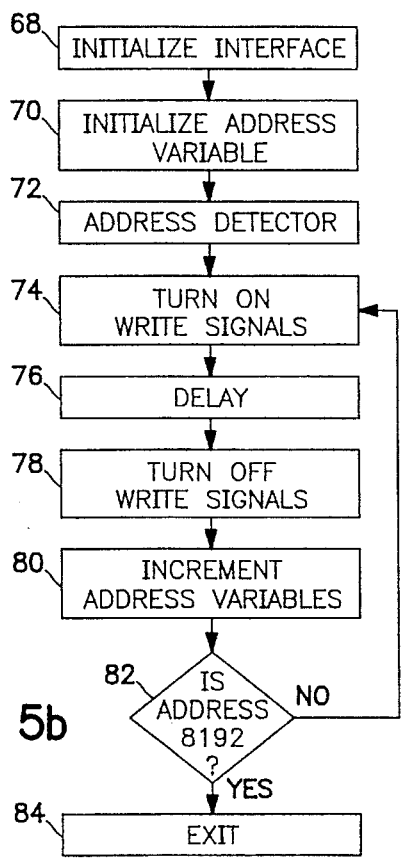
Figure 5C:
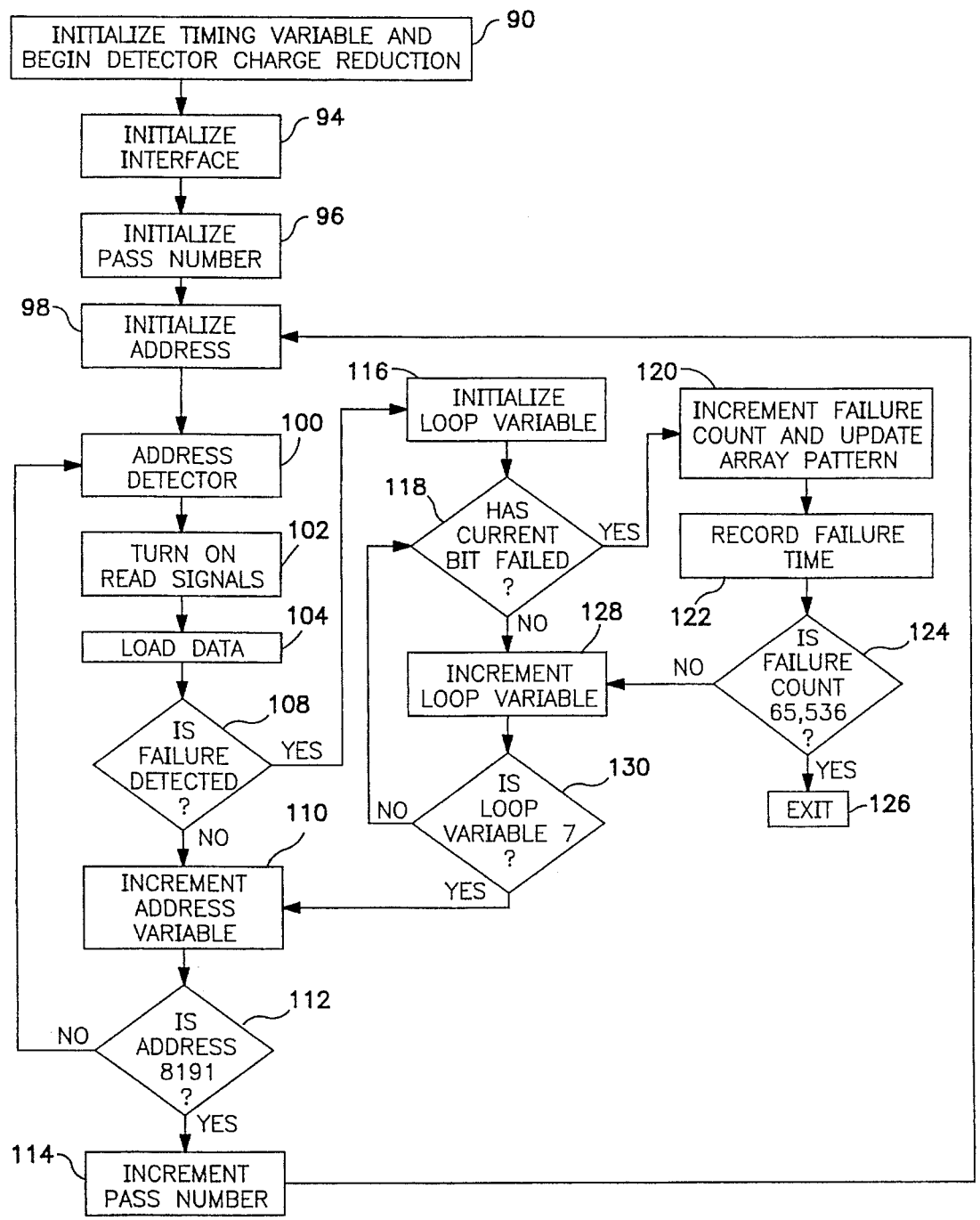

Referring now to FIGS. 5a, 5b, and 5c, one exemplary embodiment of the method according to the present invention is provided. FIGS. 5a, 5b, and 5c depict, primarily, a flow chart functionally describing a computer program performable by, for example, the external personal computer 33 described above in association with FIG. 4. Furthermore, the steps of the method depicted by this embodiment are enacted through, for example, the circuitry of the measuring mechanism and charging means of measurement device 32 as in FIG. 4.

In operation, program variables are initialized at 60 and the main program loop is entered at 62. If at 64, the charge function is indicated, the charge routine as depicted in FIG. 5b is entered at 66. Referring now to FIG. 5b in conjunction with FIG. 4, interface 34 is initialized at 68; array address variables are initialized at 70; and detector 16 is addressed at 72 through address decoder 36, interface 34 and address lines 54. In this presently preferred embodiment, the address variables correspond to blocks of eight microstructure non-volatile memory devices 18 within detector 16. This format is, however, as will be understood in the art, merely a function of the nature of device 16 and may be varied in accordance therewith.

Once the first block of devices 18 on detector 16 has been addressed, write signals are activated at 74 over control lines 52. This instruction configures the block of memory devices 18 to be charged to the predetermined initial charge. The physical enactment of the charging process is a function of the nature of device 16 and memory devices 18 and may be accomplished through specific signals on control lines 52 and, for example, program voltage line 58.

As described above, the charging process is self-limiting. Accordingly, the program delays at 76 to permit the predetermined initial charge to accumulate. The write signals are deactivated at 78 and the next block of eight memory devices 18 are addressed at 80. Because the device 16 of the presently preferred embodiment comprises 65,536 microstructure non-volatile memory devices 18, there are 8192 blocks of eight such devices 18 addressed zero through 8191. Therefore, when the address variable reaches 8192 at 82, the program exits at 84. Otherwise, the program returns to 74 and continues the loop.

Returning now to FIG. 5a, following the exit of the charge routine at 66, detector device 16 may be exposed to a radiation field at 86.

Referring additionally to the associated electronics depicted in FIG. 4, after detector device 16 has been exposed to the radiation field and placed for measurement in communication with measurement device 32, a read instruction will be given at 64, causing the program to enter at 88 the read routine depicted by FIG. 5c.

As discussed above, the readout process embodied by the method according to this presently preferred embodiment of the invention is a destructive procedure. That is, the post-irradiation charge held by microstructure non-volatile memory devices 18 is reduced at a known rate toward a threshold charge, the traversal of which causes the devices 18 to change state. Thus, the time required to cause a device 18 to change state during the readout process after exposure to an incident radiation field corresponds to the energy deposited in the device by the incident radiation field.

Accordingly, a timing variable is initialized as the detector charge reduction begins at 90. In this embodiment, the charge is reduced on all micro-structure non-volatile memory devices 18 within detector array 16 simultaneously by the application of ultraviolet light by ultraviolet light source 50. It will be understood by those of ordinary skill in the art that upon exposure to ultraviolet light, the microstructure non-volatile memory devices 18 (FIG. 3) comprising array 14 (FIG. 2) of detector device 16 lose negative charge on floating gate 24 at a known rate.

It will, furthermore, be understood by those of ordinary skill in the art that various methods of altering the charge on memory devices 18 may be employed. For example, it will be understood that, depending upon the nature of detector device 16 and memory devices 18, measurement device 32 may be configured to alter the charge on memory devices 18 through a current tunnelling technique. The current tunnelling technique has the additional advantages of creating a more accurate discharge rate and avoiding the inconvenience and possible health hazards associated with ultraviolet light source 50. Furthermore, a controlled charge alteration rate may also be achieved by imposing an electric field across sensitive volume 22 (FIG. 3) in opposition to the electric field holding the stored charge on floating gate 24. Accordingly, such charge altering method are indicated as alternatives to block 86 at 86' and 86". Additionally, as discussed above, devices 18 may be of a type having positively charged floating gates, thus requiring appropriate procedural alterations as will be understood by those of ordinary skill in the art. All of these and other equivalent methods of altering the charge on microstructure non-volatile memory devices 18 are understood to be within the scope and spirit of the present invention.

Following the timing initialization at 90, interface 34 is initialized at 94 and a pass number is initialized at 96. The pass number is a record of the number of measurement passes made through measurement array 14 within detector device 16. In general, the routine depicted by FIG. 5c repeatedly checks blocks of microstructure non-volatile memory devices 18 having changed states. By recording the time from timing variable initialization at 90 to the change of state, or failure, of an individual memory device 18, as described above, the energy deposited by incident radiation within that individual memory device 18 may be determined.

Accordingly, the address variable is initialized at 98. As described above, the method addresses blocks of eight memory devices 18. Thus, the first block of 8 memory devices 18 is addressed through address decoder 36, interface 34, and address lines 54 at 100. When read signals are activated at 102 through control lines 52, data representing the present state of the addressed block of eight memory devices 18 are loaded at 104 through data lines 106 through interface 34 to buffer 38. Such data is read by the external PC 33 through PC connector 48 and is compared to data stored by the external PC representing the expected states of the memory devices 18 within the block. Initially, in this presently preferred embodiment, the expected states will all be "off." If no discrepancy, or failure, is detected at 108, therefore, no memory device within the block has changed state. Therefore, the address variable is incremented at 110 and a check is made at 112 whether the final block of memory devices 18 have been measured. If not, the next block is addressed at 100 and the loop continues. If the last block has been read at 112 the current pass through array 14 has been completed, and, consequently, the pass number is incremented at 114 and the next pass is initiated at 98.

If a failure is detected at 108, meaning that at least one memory device 18 within the block has changed state, the loop variable is initiated at 116. The loop variable in this preferred embodiment runs from zero to seven and corresponds to each of the eight memory devices 18 within the block. Therefore, any individual microstructure non-volatile memory device 18 within array 14 may be addressed through the address variable and the loop variable. If the individual memory device 18 addressed by the address variable and the loop variable has failed at 118, the array pattern stored by the external PC is updated at 120. That is, on subsequent passes it will be expected that this particular memory device 18 will have failed. If, for example, the memory device 18 corresponding to the first loop variable within a given block has failed on this particular pass, and there are at present no other memory devices 18 within the block which have failed, the program on the next pass will expect to see one failure within the block and, therefore, more than one failure will be required at 108 to trigger step 116.

Referring again to step 120 after a failure is detected at 118, the failure count is incremented and the failure time is recorded at 122. The failure time at 122 is recorded by the external PC for the particular memory device 18 identified by its address variable and loop variable. Therefore, the program stores the failure time for each individual memory device 18 within array 14. As explained above, this failure time corresponds to the amount of energy deposited in each memory device 18. Thus, the individual energy deposition in each memory device 18 and the positional charge distribution throughout array 14 is recorded.

If at 124 the failure count equals 65,536, all memory devices 18 within array 14 have failed and the program exits at 126. If the failure count is not yet full, the loop variable is incremented at 128. If the loop variable is not yet equal to seven at 130, the routine returns to 118. If the pass through the block under measure is completed at 130, the routine returns to 110.

The method according to the above-described preferred embodiment encompasses a destructive readout of detector device 16. That is, the post-irradiation charge stored on each of microstructure non-volatile memory devices 18 is altered as described above to measure the change in stored charge level responsive to incident radiation, thereby requiring a subsequent recharge to the predetermined initial charge before detector 16 can be reused. Such a configuration is compatible with systems wherein a plurality of detector devices 16 are used and occasionally measured by remote measurement devices such as measurement device 32 as in FIG. 4. It may, however, be desirable to nondestructively read detector devices 16. For example, a visual or audible alarm might be desirable to alert the wearer of a personnel microdosimetry device that a specific dose equivalent level has been attained. Such a configuration would require associated electronics such as measurement device 32 and, consequently, an associated power source to continuously read detector device 16.

Accordingly, another possible embodiment of the method of the present invention would be utilized with a measurement device similar to, for example, measurement device 32 as in FIG. 4. As will be understood by those of ordinary skill in the art from the general description of the possible embodiment below, such circuitry as is depicted in FIG. 4, or various equivalent configurations or devices, may be employed to perform a non-destructive read of detector device 16. The nature of such equivalent configurations and devices will depend upon the circumstances of the intended use. For example, measurement device 32 might be appropriate for non-destructive read applications wherein device 16 is monitored periodically. The construction of measurement device 32 may, however, be altered, for example for power and size constraints, if the measurement device were to constantly monitor device 16. In a personnel microdosimetry application employing such an embodiment, a power source and a measurement device would be packaged together with detector device 16.

Generally, the method according to the present invention to perform the non-destructive read comprises the steps of addressing a first non-volatile memory device 18 of detector device 16, reading the state (either on or off) of the device 18, decrementing the bias on the control gate of device 18 by a small predetermined value, and recording the control gate bias at which the device 18 under measure changes state, thereafter repeating the procedure for each device 18 within the measured area of detector device 16. As is explained in more detail below, the control gate bias at which the device 18 changes state corresponds to the charge stored on the floating gate 24 (FIG. 3) therein and, therefore, to the energy deposited by incident radiation.

As with the presently preferred method encompassing the destructive read described above, an initial detection that a device 18 has changed state precludes further read procedures with respect to that device. Thus, regarding this possible embodiment, if the device 18 under measure has, on the initial read, changed state from its predetermined initial state, its control gate bias is not decremented.

The above-described non-destructive read would operate through altering the electric field between the floating gate and the substrate. As is known in the art, this electric field determines the state of the device and may be controlled by the bias on the control gate without affecting the charge collected on the floating gate. The intensity of this electric field is, however, determined by this charge. Thus, the change in the intensity of this electric field corresponds to the change in charge collected on the floating gate. Accordingly, the bias decrement required to changed the state of device 18 also corresponds to the collected charge.

As described above, the method according to one presently preferred embodiment individually measures groups of memory devices 18 within array 14. In the presently preferred embodiment as depicted in FIGS. 5a, 5b and 5c, the entire 65,536 element array is measured. However, it is to be understood to be within the scope of the present invention to measure selected portions of detector array 14. Such measured portions may be referred to as the measured area. Such a procedure may be desired if, for example, detector 14 is utilized as a personnel radiation detector. If a dangerous radiation level as indicated by, for example, a dose equivalent estimate generated from the measurement taken from the measured area is detected, it may be desirable to preserve the charge distribution held by the remaining unmeasured portion of array 14 for subsequent confirmation. Additionally, the charge routine as depicted in FIG. 5b may also address desired portions of array 14 without affecting the charge stored on the remainder of the array. Thus, it may be desirable to periodically measure and reset a measured portion of array 14, while leaving the remainder of the array as a cumulative microdosimeter for a longer period of time.

Because detector device 16 as shown in FIG. 2 is a passive microdosimetry device, charges deposited in memory devices 18 (FIG. 3) may be integrated during exposure to a complex radiation field. That is, it is possible that multiple particles may traverse the sensitive volume 22 of a single memory device 18, resulting in an accumulation of charge. It is anticipated, however, that such occurrences will generally be so infrequent or inconsequential as to have little effect on the accuracy of a dose equivalent or similar estimate. If, however, a detector device 16 were to be utilized in a radiation field wherein such charge integration would effect the accuracy of such estimates, another preferred embodiment of the present invention adequately accommodates such integration in translating to a dose equivalent or similar estimate.

Generally, because the positional charge distribution may be derived as described above, radiation patterns may be observed. Thus, for example, a particular area of array 14 may exhibit energy depositions indicative of single or multiple hits by gamma radiation. Accounting for and subtracting these energy depositions from the positional energy distribution corresponding to array 14, other energy depositions indicative of other particle types, for example neutrons, may appear. These energy depositions may, in turn, be indicative of single or multiple hits by such other particle types. It will be understood that a variety of probabilistic algorithms may be developed to analyze such positional charge distributions. It is, therefore, to be understood that any and all such equivalent techniques are within the scope and spirit of the present invention.

The ability of the present invention to measure positional charge distribution may permit its use in applications currently employing autoradiographic techniques. As is known in the art, autoradiography involves utilizing photography-like methods in analyzing radiation incident to, for example, biological tissue. A slice of such affected tissue may be taken and covered in an appropriate emulsion. When the emulsion gels, the slice is "developed." Because the radioactive material affects photographic film, a "photograph" of the radiation pattern may be obtained.

As discussed above, the present invention may provide an analysis of the positional charge distribution on an affected array. Thus, such an array may permit analysis of radiation distribution patterns without resort to autoradiographic methods. In particular, specific types of tissue may be simulated using shielding techniques as discussed above.

Furthermore, it will be apparent to those skilled in the art that various modifications and variations can be made in the apparatus and method of the above-described presently preferred embodiments without departing from the scope or spirit of the invention. For example, as described above, various realizations of a measurement device might be required, depending upon the nature of the detector device containing the array of microstructure non-volatile memory devices. Thus, it is intended that the present invention cover modifications and variations of this invention as would be apparent to those of ordinary skill in the art, as would come within the scope of the appended claims and their equivalents.

What is claimed is:

1. A passive microdosimetry detector device for recording the energy deposition of radiation incident thereto and enabling qualitative analysis of a complex radiation field, comprising an array of microstructure non-volatile memory devices, a plurality of said microstructure non-volatile memory devices each defining a corresponding microstructure sensitive volume within which charge is generated responsive to incident radiation and wherein at least one of said non-volatile memory devices is configured to store a predetermined initial charge such that said generated charge measurably alters said predetermined initial charge stored by said at least one microstructure non-volatile memory device.

2. The passive microdosimetry detector as in claim 1, wherein said plurality of memory devices are each configured to store a predetermined initial charge such that a charge generated in its corresponding sensitive volume measurably alters the predetermined initial charge stored thereby.

3. The passive microdosimetry detector as in claim 1, wherein said array of microstructure non-volatile memory devices comprises a semiconductor device.

4. The passive microdosimetry detector as in claim 3, wherein said semiconductor device is configured to individually address said at least one microstructure non-volatile memory device.

5. The passive microdosimetry detector as in claim 4, wherein said semiconductor device comprises an erasable programmable read only memory chip.

6. The passive microdosimetry detector as in claim 3, wherein said semiconductor device is configured to permit the individual measurement of said at least one microstructure non-volatile memory device by a measurement device.

7. The passive microdosimetry detector as in claim 1, further comprising shielding about said at least one microstructure non-volatile memory device so as to simulate specific biological tissue.

8. The passive microdosimetry detector as in claim 1, wherein each of said microstructure sensitive volumes is generally not more than one cubic micrometer.

9. The passive microdosimetry detector as in claim 8, wherein each of said microstructure sensitive volumes is approximately 0.1 micrometers by 1.0 micrometer by 100 angstroms thick with respect to the incidence of said radiation.

10. The passive microdosimetry detector as in claim 8, wherein each of said microstructure sensitive volumes is approximately the size of a biological cell nucleus.

11. The passive microdosimetry detector as in claim 8, wherein each of said microstructure sensitive volumes is approximately the size of a DNA genome.

12. The passive microdosimetry detector as in claim 1, wherein said predetermined initial charge is stored on an electrically insulated gate within each said at least one microstructure non-volatile memory device.

13. The passive microdosimetry detector as in claim 1, wherein said predetermined initial charge on said at least one microstructure non-volatile memory device is set relative to a known threshold charge such that traversal of said known threshold charge from said predetermined initial charge causes said at least one microstructure non-volatile memory device to change state.

14. The passive microdosimetry detector as in claim 13, wherein said at least one microstructure non-volatile memory device is configure such that incident radiation causes a charge alteration from said predetermined initial charge towards said threshold level.

15. A passive microdosimetry system for qualitatively analyzing radiation incident thereon in a complex radiation field, comprising:

at least one detector array of microstructure non-volatile memory devices, a plurality of said devices each defining a corresponding microstructure sensitive volume within which charge is generated responsive to incident radiation and wherein at least one of said microstructure non-volatile memory devices is configured to store a predetermined initial charge such that said generated charge measurably alters said predetermined initial charge stored by said at least one microstructure non-volatile memory device;

a measurement device operatively associated with said detector array, comprising
communicating device for communicating with said at least one detector array,
measuring mechanism for measuring said charge generated on said at least one microstructure non-volatile memory device; and a qualitative analyzing device operatively associated with said measurement device for converting said generated charge to a qualitative analysis of the complex radiation field.

16. The passive microdosimetry system as in claim 15, wherein said at least one detector array of microstructure non-volatile memory devices comprises a semiconductor device configured to individually address said at least one microstructure non-volatile memory device.

17. The passive microdosimetry system as in claim 16, wherein said semiconductor device comprises an erasable programmable read only memory chip.

18. The passive microdosimetry system as in claim 16, wherein said semiconductor device is configured to permit the individual measurement of said at least one microstructure non-volatile memory device by said measurement device.

19. The passive microdosimetry system as in claim 15, wherein said measuring mechanism is configured to measure said generated charge without destroying the post-irradiation charge stored on said at least one microstructure non-volatile devices.

20. The passive microdosimetry system as in claim 15, wherein each of said microstructure sensitive volumes is generally not more than one cubic micrometer.

21. The passive microdosimetry system as in claim 20, wherein each of said microstructure sensitive volumes is approximately 0.1 micrometers by 1.0 micrometer by 100 angstroms thick with respect to the incidence of said radiation.

22. The passive microdosimetry system as in claim 15, wherein said measurement device further comprises a charging device for charging said at least one microstructure non-volatile memory device to said predetermined initial charge.

23. The passive microdosimetry system as in claim 22, wherein said predetermined initial charge is stored on an electrically insulated gate within each said at least one microstructure non-volatile memory device.

24. The passive microdosimetry system as in claim 22, wherein said predetermined initial charge on said at least one microstructure non-volatile memory device is set relative to a known threshold charge such that traversal of said known threshold charge from said predetermined initial charge causes said at least one microstructure non-volatile memory device to change state.

25. The passive microdosimetry system as in claim 24, wherein said at least one microstructure non-volatile memory device is configured such that said generated charge alters said predetermined initial charge towards said threshold charge.

26. The passive microdosimetry system as in claim 25, wherein said at least one microstructure non-volatile memory device is configured such that the difference between said altered charge and said predetermined initial charge corresponds to the energy deposited by incident radiation on said at least one microstructure non-volatile memory device during exposure of said at least one detector array to incident radiation.

27. The passive microdosimetry system as in claim 24, wherein said measuring mechanism is configured to measure the charge alteration due to said charge generated by incident radiation by changing the post-irradiation charge stored on said at least one microstructure non-volatile memory device at a known rate toward said threshold charge and determining the time required for said at least one microstructure non-volatile memory device to change state.

28. The passive microdosimetry system as in claim 27, wherein said measuring mechanism is configured to change said post-irradiation charge on said at least one microstructure non-volatile memory device by optical application of ultraviolet light to said at least one detector array.

29. The passive microdosimetry system as in claim 27, wherein said measuring mechanism is configured to change said post-irradiation charge on said at least one microstructure non-volatile memory device by the application of electrically generated tunnelling current to said at least one microstructure non-volatile memory device.

30. The passive microdosimetry system as in claim 27, wherein said measuring mechanism is configured to change said post-irradiation charge on said at least one microstructure non-volatile memory device by the imposition of an electric field to said at least one microstructure non-volatile memory device in opposition to a stable state electric field maintained by said at least one microstructure non-volatile memory device.

31. The passive microdosimetry system as in claim 15, wherein said qualitative analyzing device is configured to convert said generated charge into an estimate of the number of events occurring within discrete energy bands within the measured area of said at least one detector array of microstructure non-volatile memory devices.

32. The passive microdosimetry system as in claim 31, wherein said qualitative analyzing device is configured to apply sensitive volume dependent weighting factors to said estimate according to said discrete energy bands, said weighting factors correlating to known energy ranges within which known ionizing particles, in sensitive volumes comparable to said sensitive volumes of said microstructure non-volatile memory devices, deposit energy so that a spectral analysis of the complex radiation field is generated.

33. The passive microdosimetry system as in claim 15, wherein said measuring mechanism is furthermore configured to measure the spatial distribution of said generated charge depositions throughout the measured area of said at least one detector array of microstructure non-volatile memory devices.

34. The passive microdosimetry system as in claim 33, wherein said qualitative analyzing device is configured to convert said generated charge deposition and distribution into an estimate of the number of events occurring within said measured area of said at least one detector array of microstructure non-volatile memory devices within discrete energy bands.

35. The passive microdosimetry system as in claim 34, wherein said qualitative analyzing device is configured to apply sensitive volume dependent weighting factors to said estimate according to said discrete energy bands, said weighting factors correlating to known energy ranges within which known ionizing particles, in sensitive volumes comparable to said sensitive volumes of said microstructure non-volatile memory devices, deposit energy so that a spectral analysis of the complex radiation field is generated.

36. The passive microdosimetry system as in claim 15, wherein said system is configured as a personal sized radiation microdosimetry device.

37. The passive microdosimetry system as in claim 15, wherein said system is configured as an area monitor.

38. The passive microdosimetry system as in claim 37, wherein said system is configured as an area monitor for a space platform.

39. A method for qualitatively analyzing a complex incident radiation field, comprising the step of:

subjecting to the radiation field a detector array comprised of a plurality of microstructure non-volatile memory devices having a corresponding plurality of associated microstructure sensitive volumes;

individually measuring the charge deposition on at least one of said microstructure non-volatile devices, said charge deposition being generated responsive to the incident radiation within the corresponding microstructure sensitive volume of said at least one microstructure non-volatile memory device; and outputting said charge deposition for conversion to a qualitative analysis of the complex radiation field.

40. The method as in claim 39, further comprising the steps of:

converting said charge deposition into an estimate of the number of events within discrete energy bands occurring within a measured area of said array of microstructure non-volatile memory devices; and translating said estimate into a qualitative analysis of the complex radiation field.

41. The method as in claim 40, wherein said qualitative analysis comprises a spectral analysis.

42. The method as in claim 40, wherein said measuring step further comprises the step of measuring the spatial charge distribution throughout said measured area and wherein said converting step converts said charge deposition and said spatial charge distribution to said estimate.

43. The method as in claim 40, wherein said translating step further comprises the step of applying sensitive volume dependent weighting factors to said estimate according to said discrete energy bands, said weighting factors correlating to known energy ranges within which known ionizing particles, in sensitive volumes comparable to said sensitive volumes of said microstructure non-volatile memory devices, deposit energy so that a spectral analysis of the complex radiation field is generated.

44. The method as in claim 42, wherein said translating step further comprises the step of applying sensitive volume dependent weighting factors to said estimate according to said discrete energy bands, said weighting factors correlating to known energy ranges within which known ionizing particles, in sensitive volumes comparable to said sensitive volumes of said microstructure non-volatile memory devices, deposit energy so that a spectral analysis of the complex radiation field is generated.

45. The method as in claim 39, wherein said measuring step preserves the stored charge on said at least one microstructure non-volatile memory device.

46. The method as in claim 45, further comprising the step of charging, prior to said subjecting step, said at least one microstructure non-volatile memory device of said array to a predetermined initial charge set relative to a known threshold charge such that traversal of said known threshold charge from said predetermined initial charge causes said at least one microstructure non-volatile memory device to change state and wherein said predetermined initial charge may be altered towards said threshold charge during said subjecting step responsive to incident radiation; and wherein said measuring step is further comprised of the steps of repeatedly reading the state of, and decrementing by a predetermined value the control gate bias of, each of said at least one microstructure non-volatile memory devices within a measured area of said array of microstructure non-volatile memory devices and determining the control gate bias at which each said microstructure non-volatile memory device within said measured area changes state.

47. The method as in claim 46, further comprising the steps of:

converting said control gate bias value at which each said microstructure non-volatile memory device within said measured area changes state into an estimate of the number of events within discrete energy bands occurring within said measured area; and translating said estimate into a qualitative analysis of the complex radiation field.

48. The method as in claim 47, wherein said qualitative analysis comprises a spectral analysis.

49. The method as in claim 39, further comprising the step of charging, prior to said subjecting step, said at least one microstructure non-volatile memory device of said array to a predetermined initial charge, said predetermined initial charge being altered during said subjecting step responsive to said incident radiation.

50. The method as in claim 49, wherein said predetermined initial charge is set relative to a known threshold charge such that traversal of said known threshold charge from said predetermined initial charge causes said at least one microstructure non-volatile memory device to change state.

51. The method as in claim 50, wherein said measuring step further comprises the step of changing the post-irradiation charge on said at least one microstructure non-volatile memory device at a know rate towards said threshold charge and determining the time required for said at least one microstructure non-volatile memory device to charge state.

52. The method as in claim 51, wherein said measuring step further comprises the step of detecting, prior to changing said post-irradiation charge, any said at least one microstructure non-volatile memory device having changed state responsive to incident radiation.

53. The method as in claim 51, wherein said post-irradiation charge is changed by optically applying ultraviolet light to said detector array.

54. The method as in claim 51, wherein said post-irradiation charge is changed by applying electrically generated tunnelling current to said at least one microstructure non-volatile memory device.

55. The method as in claim 51, wherein said post-irradiation charge is changed by imposing an electric field to said at least one microstructure non-volatile memory device in opposition to a stable state electric field maintained by said at least one microstructure non-volatile memory device.

56. The method as in claim 39, further comprising the step of shielding said at least one microstructure non-volatile memory device with shielding material so that said at least one microstructure non-volatile memory device simulates specific biological tissue.

57. A passive microdosimetry system for qualitatively analyzing radiation incident thereof in a complex radiation field, comprising:

at least one detector array of microstructure non-volatile memory device comprising a semiconductor device configured to individually address at least one of said microstructure non-volatile memory devices, each of said at least one microstructure non-volatile memory device being configured to store a predetermined initial charge thereon and defining a microstructure sensitive volume within which charge is generated responsive to incident radiation such that said generated charge individually and measurably alters said predetermined initial charge stored on said at least one microstructure non-volatile memory device;

measurement device operatively associated with said at least one detector array, comprising communicating device for communicating with said at least one detector array, and measuring mechanism for measuring said charge generated on said at least one microstructure non-volatile memory devices within a measured area of said at least one detector array; and a qualitative analyzing device operatively associated with said measurement device for converting said generated charge into an estimate of the number of events occurring within discrete energy bands within said measured area and applying sensitive volume dependent weighting factors to said estimate according to said discrete energy bands, said weighting factors correlating to known energy ranges within which known ionizing particles, in sensitive volumes comparable to said sensitive volumes of said microstructure non-volatile memory devices, deposit energy so that a spectral analysis of the complex radiation field is generated.

58. The passive microdosimetry system as in claim 57, wherein each microstructure sensitive volume of said at least one microstructure non-volatile memory device is generally not more than one cubic micrometer.

59. The passive microdosimetry system as in claim 57, wherein said predetermined initial charge on said at least one microstructure non-volatile memory device is set relative to a known threshold charge such that traversal of said known threshold charge from said predetermined initial charge causes said at least one microstructure non-volatile memory device to change state and wherein said at least one microstructure non-volatile memory device is configured such that said generated charge alters said predetermined initial charge towards said threshold charge.

60. The passive microdosimetry system as in claim 59, wherein said measuring mechanism is configured to measure said charge alteration due to incident radiation by changing the post-irradiation charge on said at least one microstructure non-volatile memory device at a known rate towards said threshold charge and determining the time required for said at least one microstructure non-volatile memory device to change state.

61. The passive microdosimetry system as in claim 57, wherein said system is configured as a personal sized radiation microdosimetry device.

62. The passive microdosimetry system as in claim 57, wherein said system is configured as an area monitor.

63. A method for qualitatively analyzing a complex incident radiation field, comprising the steps of:

charging to a predetermined initial charge at least one microstructure non-volatile memory device of at least one detector array of microstructure non-volatile memory devices each having an associated microstructure sensitive volume, wherein said predetermined initial charge is set relative to a known threshold charge so that the traversal of said known threshold charge from said predetermined initial charge causes said at least one microstructure non-volatile memory device to change state;

subjecting to the radiation field said at least one detector array; and measuring the generated charge on a measured area of said detector array, said generated charge being responsive to incident radiation within said microstructure sensitive volumes of the at least one microstructure non-volatile memory devices within said measured area, by changing the post-irradiation charge on at least one of said microstructure non-volatile memory device at a known rate toward said threshold charge and determining the time required for each said at least one microstructure memory device to change state.

64. The method as in claim 63, further comprising the steps of:

converting said generated charge into an estimate of the number of events occurring within discrete energy bands within said measured area; and applying sensitive volume dependent weighting factors to said estimate according to said discrete energy bands, said weighting factors correlating to known energy ranges within which known ionizing particles, in sensitive volumes comparable to said sensitive volumes of said microstructure non-volatile memory devices, deposit energy so that a spectral analysis of the complex radiation field is generated.

65. The method as in claim 63, further comprising the step of detecting, prior to said changing step, any said at least one microstructure non-volatile memory device having changed state responsive to incident radiation.

66. The method as in claim 63, further comprising the step of measuring the spatial charge distribution throughout said measured area and wherein said charge deposition and said spatial charge distribution are converted to said estimate in said converting step.

* * * * *